United States Patent [19]

Bivins

[11] 3,871,372
[45] Mar. 18, 1975

[54] COMBINATION EAR PLUG AND EAR PLUG RETAINER

[76] Inventor: Jim Bivins, 1906 N. Fourth St., Longview, Tex. 75601

[22] Filed: Feb. 19, 1974

[21] Appl. No.: 443,909

[52] U.S. Cl. ............................. 128/152, 179/107 S
[51] Int. Cl. ............................................. A61t 11/02
[58] Field of Search .... 128/151, 152; 181/23, 33 R, 181/135; 179/107 S

[56] References Cited
UNITED STATES PATENTS

| | | | |
|---|---|---|---|
| 1,997,931 | 4/1935 | Hoey | 128/152 |
| 3,395,702 | 8/1968 | White | 128/151 |

*Primary Examiner*—Richard A. Gaudet
*Assistant Examiner*—G. F. Dunne
*Attorney, Agent, or Firm*—Larson, Taylor and Hinds

[57] ABSTRACT

An article of manufacture comprising an ear plug, a housing for said ear plug, template receiving elastic means integral with said housing for receiving a template of a pair of eyeglasses, said means including a passage through which can be inserted a template of a pair of eyeglasses for frictional engagement therewith, and flexible means for connecting said ear plug to said housing.

5 Claims, 3 Drawing Figures

COMBINATION EAR PLUG AND EAR PLUG RETAINER

BACKGROUND OF THE INVENTION

1. Field of the Invention

This invention relates to a combination ear plug and ear plug retainer adapted for retention on a template of a pair of eyeglasses.

2. Description of the Prior Art

In recent years there has been a constantly increasing social concern about existing occupational hazards and as a consequence stepped up activity on the part of many forces dedicated to the elimination or alleviation of dangerous working conditions. Public interest and concern has been of such magnitude that occupational safety legislation both on a national and state level has been passed. Among the many provisions in these laws there is the requirement that employers provide ear protection as, for example, ear plugs for employees whose work subjects them to a noise level that exceeds a prescribed average number of decibels. The principal problem associated with the requirement for ear plug use, aside from a failure of many employees not to wear them due to discomfort, is ear plug loss. After leaving the noisy environment, an employee upon removing the ear plugs must put them somewhere and in so doing runs the risk fof misplacing or losing the plugs.

OBJECTS

It is an object of the present invention, therefore, to provide an ear plug — ear plug retainer combination which reduces for many the chances of loss or misplacement of ear plugs.

Another object of the invention is to provide for wearers of eyeglasses a convenient storage place for the ear plugs when not in use thereby fostering availability and increased use of ear plugs in noisy environments.

A further object of the invention is to provide a simple and economic article of manufacture especially adapted for use by workers required to wear eyeglasses either as visual correction aids or for protection against occupational hazards.

SUMMARY OF THE INVENTION

These and other objects of the invention are obtained by an article of manufacture comprising an ear plug, a housing for said ear plug, template receiving elastic means integral with said housing for receiving a template of a pair of eyeglasses, said means including a passage through which can be inserted a template of a pair of eyeglasses for frictional engagement therewith, and flexible means for connecting said ear plug to said housing.

As a preferred embodiment of the invention the end of the flexible means not attached to the housing contains a male member and the end of the ear plug contains a female member for receipt of the male member.

BRIEF DESCRIPTION OF THE DRAWING

A better understanding of the invention may be had by the following detailed description of the preferred embodiments thereof taken in connection with the accompanying drawing wherein.

DETAILED DESCRIPTION OF PREFERRED EMBODIMENT

Figure 1:
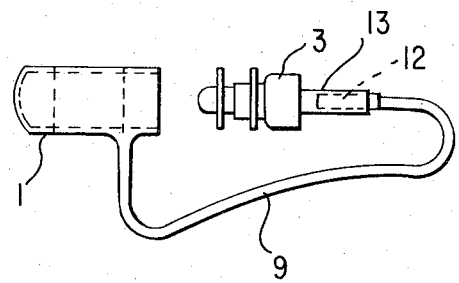
FIG. 1 is a side elevational view of the ear plug - ear plug retainer combination of the invention.
Figure 2:
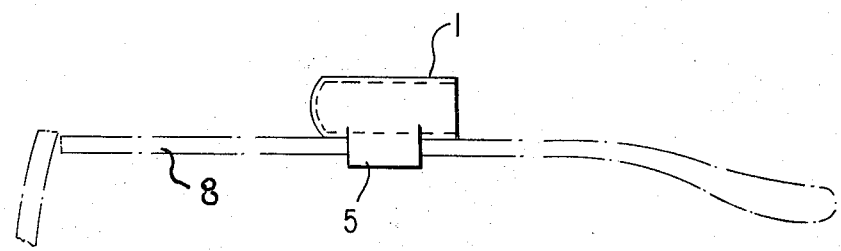
FIG. 2 is a top elevation of an ear plug - ear plug retainer combination of the invention on the right template of a pair of glasses.
Figure 3:
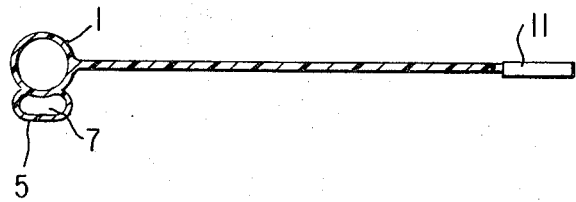
FIG. 3 is a cross-sectional view taken along section line 3—3 of FIG. 2 with the flexible connecting member fully extended.

Referring to the drawing there is a housing 1 advantageously shaped to conform to the contour of the ear plug 3 it receives. The housing is preferably closed at one end and when comprised of resilient material contains an internal diameter slightly less than the greatest external diameter of the ear plug so as to provide a friction fit therebetween. Laterally of housing 1 is an elastic member 5 the ends of which are integral with the housing so as to provide a passage 7 through which a template 8 of a pair of glasses can be inserted. The dimensions of passage 7 are selected so that when the template is inserted the elastic member 5 will stretch and fit tightly around the template or ear piece. The member 5 may be of any elastomeric material such as synthetic or natural rubber materials. The housing is preferably but not necessarily of the same material and could be, for instance, a resilient plastic housing to which the ends of member 5 are integrally secured by suitable fastening means. The plug 3 is attached to the housing 1 by a flexible connecting means which may be of any flexible material that facilitates easy insertion of the ear plug 3 into the housing 1. Illustrative of suitable materials are strands of natural or synthetic materials including threads, elastomeric rubbery materials such as natural and synthetic rubber, etc.

The connecting member 9 may be attached in any suitable manner to the housing but most advantageously the housing 1, elastic member 5 and connecting member 9 are all molded as a single unit out of the same rubbery material. Attachment of the connecting member 9 can be anywhere on the housing but preferably the attachment is on the lateral external side of the housing when it is positioned on the template. Thus, under the preferred arrangement there will be an ear plug - ear plug retainer combination for the template on the left side and another for the template on the right side, each being identical except for where on the housing the connecting member is attached.

In a preferred embodiment the connecting member 9 contains a male member 11 of, for instance, metal or synthetic plastic and the ear plug a female member 13 for receipt of the male member in tight frictional engagement therewith. Aside from the female member 13 the ear plug can be of any appropriate design and material conventionally recognized in the art.

In use, each template 8 of a pair of eyeglasses is simply inserted through passage 7 of elastic member 5 until it is positioned near the ear of the wearer.

Although in the foregoing description the present invention has been described by reference to specific preferred embodiments thereof, it is to be understood that modifications and alterations in the structure and arrangement of the invention, other than those set forth herein, may be achieved within the knowledge of those skilled in the art and that such modifications and alterations are to be considered as within the scope and purview of the invention.

It is claimed:

1. An article of manufacture comprising an ear plug, a housing for said ear plug, template receiving elastic means integral with said housing for receiving a template of a pair of eyeglasses, said means including a passage through which can be inserted a template of a pair of eyeglasses for frictional engagement therewith, and flexible means for connecting said ear plug to said housing.

2. An article of manufacture according to claim 1 wherein the end of the flexible means not affixed to said housing contains a male member and the ear plug contains a female member at one end for receipt of said male member.

3. An article of manufacture according to claim 1 wherein the housing and template receiving elastic means are of rubber.

4. An article of manufacture according to claim 1 wherein the template receiving elastic means comprises an elastic strand integral at each end with said housing.

5. An article of manufacture according to claim 4 wherein the housing is substantially cylindrical and has an internal diameter slightly greater than the greatest external diameter of the ear plug so as to frictionally engage therein.

* * * * *